United States Patent
Gaully et al.

(10) Patent No.: US 9,182,310 B2
(45) Date of Patent: Nov. 10, 2015

(54) METHOD AND A DEVICE FOR CORRECTING A MEASUREMENT OF THE PRESSURE OF A GAS STREAM FLOWING IN AN AIRCRAFT ENGINE

(75) Inventors: Bruno Robert Gaully, Marolles en Hurepoix (FR); Maurice Georges Vernochet, La Rochette (FR)

(73) Assignee: SNECMA, Paris (FR)

( * ) Notice: Subject to any disclaimer, the term of this patent is extended or adjusted under 35 U.S.C. 154(b) by 421 days.

(21) Appl. No.: 13/577,776

(22) PCT Filed: Feb. 11, 2011

(86) PCT No.: PCT/FR2011/050285
§ 371 (c)(1),
(2), (4) Date: Oct. 24, 2012

(87) PCT Pub. No.: WO2011/101579
PCT Pub. Date: Aug. 25, 2011

(65) Prior Publication Data
US 2013/0031949 A1 Feb. 7, 2013

(30) Foreign Application Priority Data
Feb. 18, 2010 (FR) ..................... 10 51169

(51) Int. Cl.
*G01L 27/00* (2006.01)
*F01D 17/08* (2006.01)
*G01L 19/02* (2006.01)
*F01D 21/00* (2006.01)

(52) U.S. Cl.
CPC .............. *G01L 27/002* (2013.01); *F01D 17/08* (2013.01); *F01D 21/003* (2013.01); *G01L 19/02* (2013.01); *F05D 2200/12* (2013.01); *F05D 2220/323* (2013.01); *F05D 2260/80* (2013.01); *F05D 2270/051* (2013.01)

(58) Field of Classification Search
CPC ..................................................... G01L 27/002
See application file for complete search history.

(56) References Cited

U.S. PATENT DOCUMENTS

| 4,598,381 A | 7/1986 | Cucci | |
|---|---|---|---|
| 2002/0195086 A1* | 12/2002 | Beck et al. | ..................... 123/435 |

(Continued)

FOREIGN PATENT DOCUMENTS

| EP | 0 188 909 | 7/1986 |
|---|---|---|
| FR | 2 886 981 | 12/2006 |

(Continued)

OTHER PUBLICATIONS

International Search Report Issued Jun. 20, 2011 in PCT/FR11/50285 Filed Feb. 11, 2011.

*Primary Examiner* — Paul West
(74) *Attorney, Agent, or Firm* — Oblon, McClelland, Maier & Neustadt, L.L.P.

(57) ABSTRACT

A method to correct a current measurement of pressure of a gas stream delivered during a mission by a sensor in the engine. The method includes: estimating a drift error affecting the sensor on the basis of a difference existing between: (1) a calibration measurement of the pressure of the gas stream as delivered by the sensor in the engine, and (2) an atmospheric pressure measurement delivered by a sensor of the aircraft presenting accuracy greater than that of the sensor in the engine; these measurements being performed while the sensor in the engine and the sensor of the aircraft are subjected to same surrounding atmospheric pressure; and subtracting the estimated drift error from the current measurement.

10 Claims, 2 Drawing Sheets

(56) References Cited

U.S. PATENT DOCUMENTS

2006/0282200 A1 12/2006 Thiel et al.
2009/0222230 A1* 9/2009 Bauerle .......................... 702/98

FOREIGN PATENT DOCUMENTS

| | | |
|---|---|---|
| JP | 2006 348778 | 12/2006 |
| JP | 2009 2875 | 1/2009 |

* cited by examiner

METHOD AND A DEVICE FOR CORRECTING A MEASUREMENT OF THE PRESSURE OF A GAS STREAM FLOWING IN AN AIRCRAFT ENGINE

BACKGROUND OF THE INVENTION

The present invention relates to the general field of aviation. It applies more particularly but in non-limiting manner to turbine engines, and in particular to turbojets.

More particularly, the invention relates to measuring operating parameters of an aircraft engine, such as for example the pressure of a gas stream flowing in the engine.

In known manner, an aircraft engine is controlled and regulated on the basis of measurements supplied by dedicated computers of the aircraft and based on sensor technologies that are known for their stability and for their accuracy. This applies in particular to atmospheric pressure, written P0, which is supplied by a computer dedicated to atmospheric parameters (known as an "air data computer"), e.g. making use of sensors of the quartz type or of the vibrating cylinder type that present long-term accuracy.

For simplification purposes, in the description below, the term "aircraft measurements" is used to designate pressure measurements provided by these dedicated computers of the aircraft.

The aircraft measurement of atmospheric pressure is used by the full authority digital engine control (FADEC) unit, in particular for controlling the thrust of the aircraft engine. Given the importance of this parameter, the FADEC also has an atmospheric pressure measurement available that is performed by another sensor, which sensor is in the engine computer of the aircraft.

This measurement referred to below as the "engine measurement" (in contrast to the aircraft measurement) is used in the event of aircraft measurements of atmospheric pressure being lost in order to limit variation in the thrust of the engine. It must therefore be accurate, and it is the subject of draconian regulations concerning the maximum thrust variation that can be allowed to occur in the event of aircraft measurements being lost.

In order to comply with these regulations, a first solution that engine manufacturers have considered consists in having recourse to engine sensors that present good performance, i.e. close to that of aircraft sensors. Nevertheless, such sensors are very expensive because of their accuracy.

Furthermore, sensors in the engine are subjected to a thermomechanical environment that is much more severe than that to which aircraft sensors are subjected. Consequently, as a general rule, it is very difficult to guarantee that the performance of such sensors will be stable for use over a long duration.

It is thus common for an engine sensor that has been in use for several years to present a significant amount of drift error (also known as "zero error" or as "offset"). Since the sensor is required to continue complying with the regulations in force in spite of this significant drift error, it is necessary for its accuracy when new to be very great so as to ensure that it remains within its tolerance margin for as long as possible.

OBJECT AND SUMMARY OF THE INVENTION

A particular object of the invention is to mitigate those drawbacks by proposing a method of correcting a current measurement of the pressure of a gas stream flowing inside an engine propelling an aircraft, this measurement being delivered during a mission of the aircraft by a sensor in the engine. In accordance with the invention, this correction method comprises:

an estimation step of estimating a drift error affecting the sensor, on the basis of a difference existing between:
 a calibration measurement of the pressure of the gas stream delivered by the sensor in the engine; and
 a measurement of atmospheric pressure delivered by a sensor of the aircraft, the aircraft sensor presenting measurement accuracy greater than that of the sensor in the engine;

the calibration measurement and the atmospheric pressure measurement being performed under conditions in which the sensor in the engine and the aircraft sensor are subjected to the same surrounding atmospheric pressure; and a subtraction step of subtracting the estimated drift error from the current measurement of the pressure of the gas stream.

Correspondingly, the invention also provides a correction device for correcting a current measurement of pressure of a gas stream flowing inside an engine propelling an aircraft, the measurement being delivered during a mission of the aircraft by a sensor in the engine, the device comprising:

means for acquiring:
 a calibration measurement of the pressure of the gas stream as delivered by the sensor in the engine; and
 an atmospheric pressure measurement as delivered by a sensor of the aircraft, the aircraft sensor presenting measurement accuracy greater than that of the sensor in the engine;

the calibration measurement and the atmospheric pressure measurement being performed under conditions in which the sensor in the engine and the aircraft sensor are subjected to the same surrounding atmospheric pressure;

means for estimating a drift error affecting the sensor in the engine from a difference existing between the calibration measurement and the atmospheric pressure measurement; and means for subtracting the estimated drift error from the current measurement of the pressure of the gas stream.

It should be observed that in the meaning of the invention, the term "aircraft sensor" is used in contrast to the term "sensor in the engine" and means a sensor placed in the aircraft and outside the engine.

The invention thus proposes correcting engine measurements of the pressure of the gas stream flowing through the engine with the help of aircraft measurements of atmospheric pressure. Given the sensors that are conventionally used in aircraft, such aircraft measurements have the reputation of being accurate and stable.

Current engine measurements corrected by the invention may relate to the pressures of gas streams measured at various locations in the engine: for example the pressure may be atmospheric pressure at the inlet to the engine, the pressure of the gas stream at the outlet from the fan when the engine is a turbojet, etc. The invention makes it possible in particular to correct the pressure measurements used for regulating thrust or for monitoring the engine, whenever the measured pressure presents a range of values that is greater than or equal to the range of values of atmospheric pressure.

Thus, there is no need to fit sensors in the engine that are very accurate and very expensive since the invention makes it possible, advantageously, to compensate for the inaccuracy of the engine sensors. The invention is preferably applied to engine sensors of inaccuracy that results essentially from drift error.

More particularly, the invention proposes estimating the zero error of the engine sensor by taking measurements of atmospheric pressure while the engine and the aircraft are at predetermined operating points, and by subtracting the zero error estimate from the engine measurement in order to correct the drift of the sensor in the engine.

It should be observed herein that the terms "drift error" or "zero error" are used to mean the error in the measurement of a variable X that occurs when that variable itself has a value of zero. The drift error does not depend on the value of the measured variable.

The operating points selected for estimating the drift error correspond to conditions in which the sensor in the engine and the aircraft sensor are both subjected to the same surrounding atmospheric pressure. Naturally, in order to ensure that this constraint is satisfied, account may be taken of differences in the altitudes at which the sensors are installed, in other words the altitude difference between the engine sensor and the aircraft sensor in question.

Thus, and preferably, the measurements are performed when an engine is stopped (i.e. before the engine is started or for a given engine computer temperature after the engine has been sopped for a given length of time, in order to eliminate error associated with temperature hysteresis), and while the aircraft is stationary on the ground, e.g., for example, in an airplane propelled by a turbojet, immediately after initializing the FADEC.

Under such conditions, the kinds of inaccuracy other than drift error that might affect the aircraft sensor and the engine sensor, such as for example calibration errors, pressure hysteresis, and/or temperature hysteresis, the surroundings of the sensors, have limited influence on the measurements delivered by the aircraft and engine sensors, or at very least have much the same influence on the measurements delivered by the aircraft sensor and on the measurements delivered by the engine sensor.

In other words, under such conditions, a difference between the pressure value under consideration for the gas stream flowing through the engine as delivered by the sensor in the engine and the value of the atmospheric pressure as delivered by the aircraft sensor is assumed in the invention to be due essentially to the drift error affecting the sensor in the engine. Since the aircraft sensor is more accurate and more stable than the engine sensor, it is considered that it presents negligible drift error.

Consequently, by subtracting this difference from the engine measurement while the aircraft is on a mission, a more accurate measurement is obtained of the pressure of the gas stream, and this applies regardless of the operating speed of the aircraft and of the engine.

By means of the invention, it is thus possible for engine manufacturers to make use of sensors that are inexpensive, even if they are the subject of large amounts of drift error, and to do so while guaranteeing measurement accuracy that makes it possible to comply with the regulations in force (i.e. the maximum thrust variation allowable in the event of losing aircraft measurements).

Furthermore, the drift error may be estimated at various times during the lifetime of the equipment of the aircraft, in order to correct for possible drift over time in the sensor in the engine.

In another aspect, the invention also provides a turbine engine including a correction device in accordance with the invention.

In a particular embodiment, the various steps of the correction method are determined by computer program instructions.

Consequently, the invention also provides a computer program on a data medium, the program being suitable for being implemented in a correction device or more generally in a computer, the program including instructions adapted to implementing steps of a correction method as described above.

The program may use any programming language, and may be in the form of source code, object code, or code intermediate between source code and object code, such as in a partially compiled form, or in any other desirable form.

The invention also provides a computer-readable data medium including instructions of a computer program as mentioned above.

The data medium may be any entity or device capable of storing the program. For example, the medium may comprise storage means such as a read-only memory (ROM), e.g. a compact disk (CD) ROM, or a micro-electronic circuit ROM, or indeed magnetic recording means, e.g. a floppy disk or a hard disk.

Furthermore, the data medium may be a transmissible medium such as an electrical or optical signal that may be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In another aspect, the invention also provides a system for measuring the pressure of a gas stream flowing inside an engine propelling an aircraft, the system comprising:

a first sensor for sensing the pressure of the gas stream, the first sensor being in the engine;

a second sensor for sensing atmospheric pressure, the second sensor being in the aircraft outside the engine and presenting measurement accuracy greater than that of the first sensor;

means for triggering:

a calibration measurement of the pressure of the gas stream by the first sensor; and an atmospheric pressure measurement by the second sensor;

under conditions in which the first and second sensors are subjected to the same surrounding atmospheric pressure; and a correction device of the invention, adapted to correct a current pressure measurement delivered during a mission of the aircraft by the first sensor and to estimate the drift error affecting the first sensor on the basis of a difference existing between the atmospheric pressure measurement and the calibration measurement.

BRIEF DESCRIPTION OF THE DRAWINGS

Other characteristics and advantages of the present invention appear from the following description with reference to the accompanying drawings that show an embodiment having no limiting character. In the figures.

DETAILED DESCRIPTION OF AN EMBODIMENT

Figure 1:
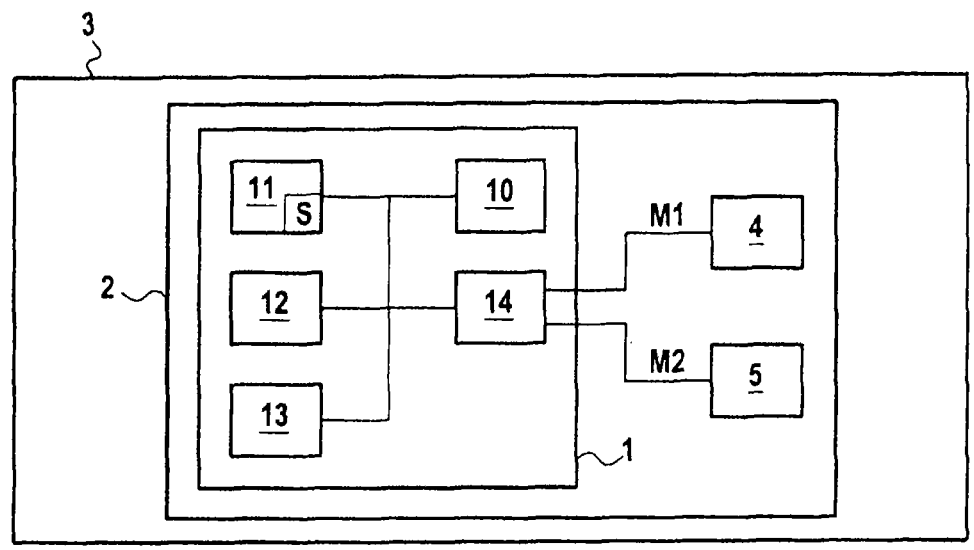
FIG. 1 shows a particular embodiment of a correction device in accordance with the invention in its environment.

FIG. 1 shows a particular embodiment of a device 1 in accordance with the invention for correcting an engine pressure measurement M1, the device being shown in its environment.

In the present example, the measurement M1 is a current measurement of the static air pressure at the outlet from the high-pressure compressor of a turbojet 2 propelling an aircraft 3. This measurement is delivered during a mission of the aircraft by a sensor 4 fitted in the turbojet, e.g. on the outer casing of the turbojet.

Nevertheless, these assumptions are not limiting. The invention makes it possible to correct measurements of the pressure of the air or any other gas stream flowing in the turbojet at other locations thereof: for example at the inlet to the turbojet, at the inlet to the high-pressure compressor, at the outlet from the fan, at the outlet from the low-pressure turbine, etc.

The invention is also applicable to other types of engine for airplanes and more generally aircraft, and in particular to other turbine engines (e.g. a turboprop).

In this example, the sensor 4 is a piezo-resistive pressure sensor with strain gauges connected as a Wheatstone bridge, and known to the person skilled in the art. It is assumed that the sensor 4 suffers from inaccuracy due essentially to the presence of a drift error.

In known manner, the aircraft 3 is also fitted with various sensors suitable for measuring operating parameters of the aircraft and of the turbojet 2, such as in particular atmospheric pressure P0. These sensors are located outside the turbojet. They are known to be accurate and stable over time (no drift or practically no drift).

Thus, in particular, the aircraft 3 has a quartz pressure sensor 5 that is known to the person skilled in the art and situated in the cockpit, for example. Naturally, it is possible to envisage other locations for the sensor 5.

The sensor 5 presents measurement accuracy that is greater than the accuracy of the sensor 4, typically of the order of one millibar or a few hectopascals (hPa).

In the present example, the greater accuracy of the sensor 5 also stems from the fact that the atmospheric pressure P0 measured by the pressure sensor 5 lies within a range of values that is included with the range of pressure values PS3 that are measured by the sensor 4. For example, during a mission of an aircraft fitted with a turbojet, it is common to encounter a factor of 30 to 40 between atmospheric pressure P0 and the pressure PS3 at the outlet from the high-pressure compressor of the turbojet.

The pressure sensor 5 is an aircraft sensor in the meaning of the invention. It is adapted to deliver an aircraft measurement M2 of atmospheric pressure P0 to the FADEC of the aircraft (not shown in FIG. 1), in particular in order to enable the turbojet 2 to be regulated and controlled.

It should be observed that each sensor 4 and 5 is associated with a respective acquisition system (not shown in FIG. 1) that includes in particular an analog-to-digital converter adapted to deliver the measurements taken by the sensor 4 or 5 in digital form. The elements making up an acquisition system and the principles on which they operate are known to the person skilled in the art and are not described in greater detail herein.

Thus, in the meaning of the invention, the measurements M1 and M2 delivered respectively by the sensors 4 and 5 refer to digital outputs from analog-to-digital converters in the acquisition systems of the sensors.

For simplification purposes, in the description below, the sensor 4 in the turbojet 2 is referred to as an "engine sensor 4", and the aircraft sensor 5 is referred to as the "aircraft sensor 5".

It should be observed that the invention also applies to sensors of types other than those mentioned above. Other sensors, of low cost, even sensors presenting significant drift error, may be used as engine sensors, and other sensors presenting good properties in terms of accuracy and stability of their performance over time may be envisaged as aircraft sensors 5. For example, in a variant, the sensors 4 and 5 may be vibrating cylinder sensors.

In the presently-described embodiment, the correction device 1 is incorporated in the FADEC and possesses the hardware architecture of a computer.

It includes in particular a processor 10, a ROM 11, a random-access memory (RAM) 12, a non-volatile memory 13, and communications means 14 for communicating with the engine sensor 4 and with the aircraft sensor 5.

These communications means are constituted in particular by conventional digital data buses.

Figure 3A:
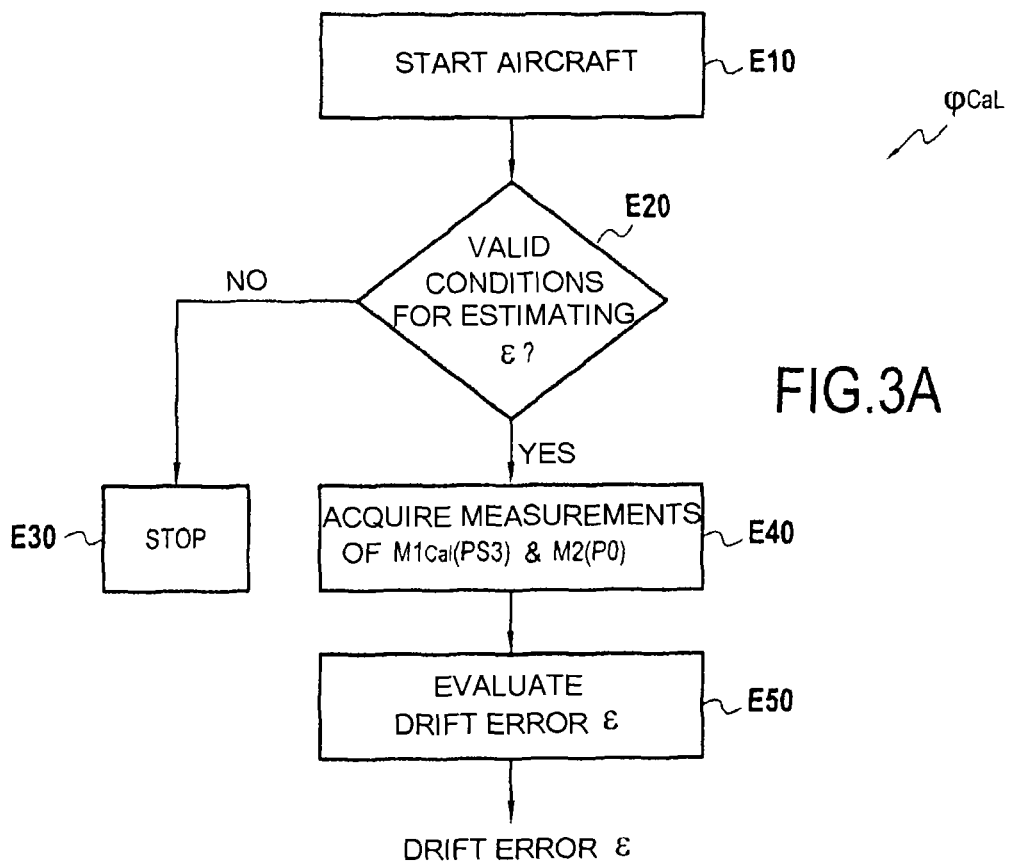
FIGS. 3A and 3B are flow charts showing the main steps of the correction method of the invention in a particular embodiment in which it is implemented by the device of FIG. 1.
Figure 3B:
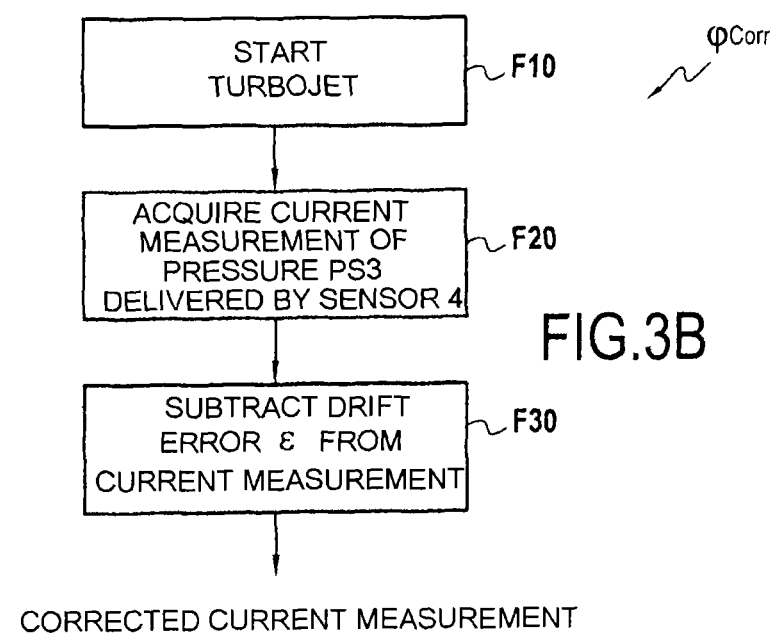

The ROM 11 constitutes a recording medium readable by the processor 10 of the correction device and having recorded thereon a computer program S including instructions for executing the steps of a correction method in accordance with the invention, as shown in FIGS. 3A and 3B that are described below.

As mentioned above, in accordance with the invention, the current measurement M1 delivered by the sensor 4 during a mission are corrected with the help of an estimated value for the drift error affecting that sensor.

Figure 2:
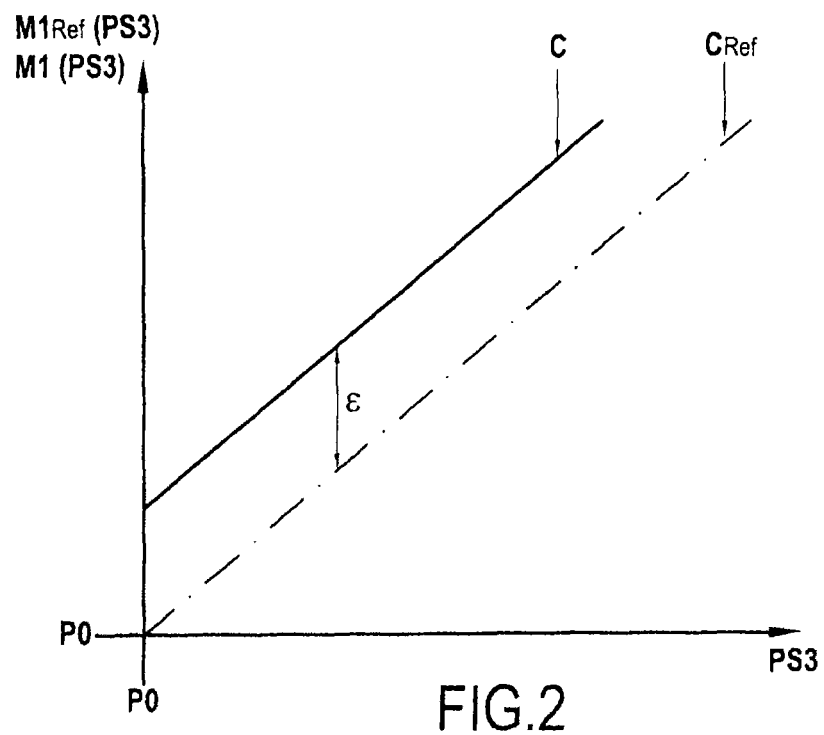
FIG. 2 is a diagram showing an example of drift error affecting the engine sensor shown in FIG. 1.

FIG. 2 is a diagram showing the drift error affecting the sensor 4.

In this figure, the curve CRef represents a reference curve for which the pressure measurement M1Ref(PS3) delivered by the sensor 4 is equal to the real pressure PS3 of the air at the outlet from the high-pressure compressor of the turbojet 2. In other words, the curve CRef represents the pressure measurement that would be delivered by the sensor 4 if it were not affected by any defect and in particular by any drift error.

The curve C shows the pressure measurement M1(PS3) actually delivered by the sensor 4 as a function of pressure PS3.

In the presently-considered example, it can be seen that the curves CRef and C are parallel. More precisely, for each value of the pressure PS3 at the outlet from the high-pressure compressor, the following relationship applies:

$$M1(PS3) = M1\text{Ref}(PS3) + \epsilon$$

where $\epsilon$ is a real number, representing the drift error affecting the sensor 4.

For reasons of simplification, FIG. 2 ignores other causes of inaccuracy that might affect the pressure measurement delivered by the sensor 4, such as for example: calibration errors, hysteresis concerning pressure and/or temperature; and the environment of the sensor 4. The drift error $\epsilon$ is thus known, ignoring these other possible errors.

The drift error $\epsilon$ is independent of the measured pressure PS3. In the example shown in FIG. 2 it is positive. Nevertheless, it is equally possible to have a drift error that is negative.

In order to estimate this drift error in accordance with the invention, two measurements are used written respectively M1Cal(PS3) and M2(P0), these measurements being taken by the engine sensor 4 and the aircraft sensor 5 at special moments that represent particular operating points of the turbojet 2 and of the aircraft 3.

These particular operating points correspond to conditions for which the engine sensor 4 and the aircraft sensor 5 are subjected to the same surrounding atmospheric pressure P0, ignoring differences in the altitudes at which the sensors are installed.

Thus, under such conditions, and in the absence of drift error, the engine sensor 4 ought to deliver a pressure measurement PS3 that is identical or quasi-identical to the atmospheric pressure measurement P0 delivered by the aircraft sensor 5, which measurement is assumed to be very accurate and substantially equal to M1Ref(PS3). Since the aircraft sensor is more accurate and more stable than the engine sensor, it is considered that it presents negligible drift error.

It should be observed that the assumption whereby other sources of inaccuracy that might affect the pressure measurement delivered by the sensor 4 are ignored in FIG. 2 has little impact on the correction performed by the invention. As mentioned above, the invention advantageously proposes making use of particular operating points of the turbojet 2 and of the aircraft 3 at which the influence of those kinds of error on the aircraft measurement and on the engine measurement are considered to be similar, or at least the difference that exists between those kinds of error for the aircraft measurements and for the engine measurements is minimized.

Since the sensor 4 presents a drift error $\epsilon$, it delivers a measurement M1Cal(PS3) such that:

$$M1\text{Cal}(PS3) = M2(P0) + \epsilon$$

In other words:

$$\epsilon = M1\text{Cal}(PS3) - M2(P0)$$

Thus, advantageously in the invention, the drift error $\epsilon$ affecting the sensor 4 is estimated simply from the measurements M1Cal(PS3) and M2(P0).

The main steps of the correction method of the invention are described in greater detail below with reference to FIGS. 3A and 3B for a particular implementation in which the method is implemented by the correction device 1 shown in FIG. 1. These steps advantageously rely on the above-described principle.

Implementation of the correction method of the invention relies on two distinct stages: a first stage $\phi$Cal relates to calibration during which the drift error affecting the sensor 4 is estimated (FIG. 3A), and then a second stage $\phi$Corr relates to correction during which the current measurements delivered by the sensor 4 are corrected with the help of the drift error as estimated in this way (FIG. 3B).

As described above, estimating drift error in accordance with the invention requires the engine sensor 4 and the aircraft sensor 5 to be subjected to the same surrounding atmospheric pressure P0. It is only when such conditions are satisfied that it is possible to use the measurements delivered respectively by the sensor 4 and the sensor 5 in order to estimate the drift error.

Thus, with reference to FIG. 3A, after the aircraft 3 has been started (step E10), the processor 10 begins by determining whether the above conditions for estimating the drift error $\epsilon$ are satisfied (step E20).

In known manner, when firstly the turbojet 2 is stopped (i.e. when it is not rotating) and secondly the aircraft 3 is stationary on the ground, the engine sensor 4 and the aircraft sensor 5 are both subjected to the same surrounding atmospheric pressure (ignoring a difference of altitude between the sensors): conditions for estimating the drift error are then valid.

These two constraints are satisfied in particular at the end of the initialization stage of the FADEC (which takes place after actuating the start command for the aircraft 3), prior to the FADEC sending a starting sequence to the turbojet causing it to rotate.

During this initialization stage, the FADEC (and thus the correction device 1 incorporated in the FADEC) is powered by the electricity network of the aircraft 3, but the starter generator of the turbojet has not yet been switched on. The turbojet 2 is thus not yet rotating and is considered as being stopped in the meaning of the invention.

Thereafter, at the end of this initialization stage, the engine control unit (ECU) of the FADEC sends a starting sequence to the controller of the turbojet starter-generator so as to cause its exciter to switch to starter mode. The starter-generator is then switched on.

Thereafter, the ECU controls various accessories of the turbojet until it has started proper, i.e. until it has been spun up. The electrical power supply for the ECU and more generally for the FADEC is then provided by the turbojet itself.

Thus, in the presently-described embodiment in which an engine measurement of the pressure PS3 is corrected with the help of an aircraft measurement of the pressure P0, conditions for estimating the drift error 8 are considered as being satisfied until the end of the FADEC initialization stage is detected and prior to sending the starting sequence to the turbojet. In any event, it is ensured that the turbojet is not already rotating.

Similar constraints may also be taken into consideration when pressures other than the pressure PS3 are involved, insofar as these other pressures may differ from atmospheric pressure P0.

In contrast, when seeking to correct an engine measurement of atmospheric pressure using an aircraft measurement of that atmospheric pressure, the constraint requiring the engine sensor and the aircraft sensor to be subjected to the same atmospheric pressure can be satisfied in situations other than when the turbojet is stopped and the aircraft is stationary on the ground. It is also possible for such a constraint to be satisfied during the mission of the aircraft.

If the processor 10 determines that conditions for estimating the drift error $\epsilon$ are not satisfied, the correction method stops (step E30).

In contrast, if the processor determines that the conditions for estimating the drift error g are satisfied, then the current measurements delivered by the engine sensor 4 and by the sensor 5 are acquired (step E40).

These measurements are constituted firstly by a "calibration" measurement M1Cal(PS3) of the pressure PS3 as delivered by the engine sensor 4, and secondly by a measurement M2(P0) of the atmospheric P0 as delivered by the aircraft sensor 5.

It should be observed that in the presently-described embodiment, the processor 10 merely recovers the measurements delivered by the sensors 4 and 5 at the time that it detects that the conditions for estimating the drift error are satisfied. In a variant, the processor 10 may actively trigger those measurements, on detecting that the conditions for estimating the drift error are satisfied.

Thereafter, the processor 10 uses those two measurements to evaluate the drift error E affecting the sensor 4 (step E50), by calculating the difference that exists between the measurements M1Cal(PS3) and M2(P0):

$$\epsilon = M1\text{Cal}(PS3) - M2(P0)$$

The drift error $\epsilon$ as estimated in this way is then stored in the non-volatile memory 13 of the correction device 1.

In this example, the drift error is evaluated before actually starting the turbojet 2. Nevertheless, in a variant, estimation may be performed subsequently, providing the measurements M1Cal(PS3) and M2(P0) are acquired when the sensor 4 and the sensor 5 are both subjected to the same surrounding atmospheric pressure.

The step E50 closes the calibration stage φCal. This calibration stage may be implemented at the start of each mission of the aircraft 3, or at wider intervals, e.g. once per year, since the drift error of a sensor varies slowly as a function of time.

Storing the drift error ε in the non-volatile memory 13 enables the correction device 1 to have easy access to the most recent estimated value for the drift error in order to correct the current measurements delivered by the engine sensor 4 during subsequent missions of the aircraft 3.

With reference to FIG. 3B, the correction stage φCorr in which the current measurements from the sensor 4 are corrected begins as soon as the turbojet starts (step F10).

The processor 10 of the correction device 1 acquires each of the current measurements M1(PS3) of the pressure PS3 as delivered by the sensor 4 (step F20).

It then subtracts from this measurement the drift error E as extracted from the non-volatile memory 13 (step F30) in order to obtain a corrected measurement M1Corr(PS3):

$$M1Corr(PS3)=M1(PS3)-\epsilon$$

The current measurement M1Corr(PS3) as corrected in this way constitutes an accurate measurement of the pressure PS3, free of any drift error. The invention thus makes it possible to use low-cost engine sensors while complying with the regulations in force in terms of the accuracy of the measurements delivered by such sensors.

It should be observed that in the example described herein, an atmospheric pressure measurement P0 is used to correct the measurements of the pressure PS3. Nevertheless, that assumption is not limiting, and other pressure measurements of gas streams flowing in the turbojet may be corrected. In particular, the invention also makes it possible to correct an engine measurement of atmospheric pressure P0 with the help of an aircraft measurement of the same atmospheric pressure.

The invention claimed is:

1. A method of correcting a current measurement of pressure of a gas stream flowing inside a turbojet engine propelling an aircraft, the measurement being delivered during a mission of the aircraft by a first sensor in the turbojet engine, the correction method comprising:
   determining if a condition for estimating a drift error is satisfied;
   measuring a calibration pressure of the gas stream using the first sensor in the turbojet engine if the condition for estimating the drift error is satisfied;
   measuring an atmospheric pressure using a second sensor of the aircraft if the condition for estimating the drift error is satisfied, the second sensor presenting measurement accuracy greater than that of the first sensor in the turbojet engine and being disposed in the aircraft and outside of the turbojet engine;
   estimating a drift error affecting the first sensor based on a difference between the calibration pressure measured using the first sensor and the atmospheric pressure measured using the second sensor;
   measuring the current measurement of the pressure of the gas stream flowing inside the turbojet engine using the first sensor; and
   subtracting the estimated drift error from the current measurement of the pressure of the gas stream,
   wherein the condition for estimating the drift error includes a condition in which the first sensor in the turbojet engine and the second sensor in the aircraft are subjected to same surrounding atmospheric pressure.

2. A method of correcting a measurement according to claim 1, wherein the condition for estimating the drift error is satisfied when the turbojet engine is stopped and the aircraft is stationary on the ground.

3. A method of correcting a measurement according to claim 1, wherein the first sensor is disposed on an outer casing of the turbojet engine.

4. A method of correcting a measurement according to claim 1, wherein the second sensor is disposed in a cockpit of the aircraft.

5. A non-transitory readable medium including computer executable instructions for executing the correction method of claim 1 when the computer executable instructions are executed by a computer.

6. A correction device for correcting a current measurement of pressure of a gas stream flowing inside a turbojet engine propelling an aircraft, the measurement being delivered during a mission of the aircraft by a sensor in the turbojet engine, the device comprising:
   means for determining if a condition for estimating a drift error is satisfied;
   means for measuring a calibration pressure of the gas stream using the first sensor in the turbojet engine if the condition for estimating the drift error is satisfied;
   means for measuring an atmospheric pressure using a second sensor of the aircraft if the condition for estimating the drift error is satisfied, the second sensor presenting measurement accuracy greater than that of the first sensor in the turbojet engine and being disposed in the aircraft and outside of the engine;
   means for estimating a drift error affecting the first sensor in the turbojet engine based on a difference between the calibration pressure measured using the first sensor and the atmospheric pressure measured using the second sensor;
   measuring the current measurement of the pressure of the gas stream flowing inside the turbojet engine using the first sensor; and
   means for subtracting the estimated drift error from the current measurement of the pressure of the gas stream.

7. A correction device according to claim 6, wherein the first sensor is disposed on an outer casing of the turbojet engine.

8. A correction device according to claim 6, wherein the second sensor is disposed in a cockpit of the aircraft.

9. A turbomachine comprising a device according to claim 6.

10. A system for measuring pressure of a gas stream flowing inside a turbojet engine propelling an aircraft, the system comprising:
   a first sensor for sensing pressure of the gas stream, the first sensor being in the turbojet engine;
   a second sensor for sensing atmospheric pressure, the second sensor being in the aircraft outside the turbojet engine and presenting measurement accuracy greater than that of the first sensor;
   means for triggering:
      (1) a calibration measurement of the pressure of the gas stream by the first sensor, and (2) an atmospheric pressure measurement by the second sensor;
under conditions in which the first and second sensors are subjected to same surrounding atmospheric pressure; and
a correction device according to claim 6, configured to correct a current pressure measurement delivered during a mission of the aircraft by the first sensor and to estimate drift error affecting the first sensor on the basis of a difference existing between the atmospheric pressure measurement and the calibration measurement.

* * * * *